May 12, 1964 W. E. GLASSBURN 3,133,230
ELECTRORESPONSIVE PROTECTIVE SYSTEMS
Filed Sept. 8, 1961
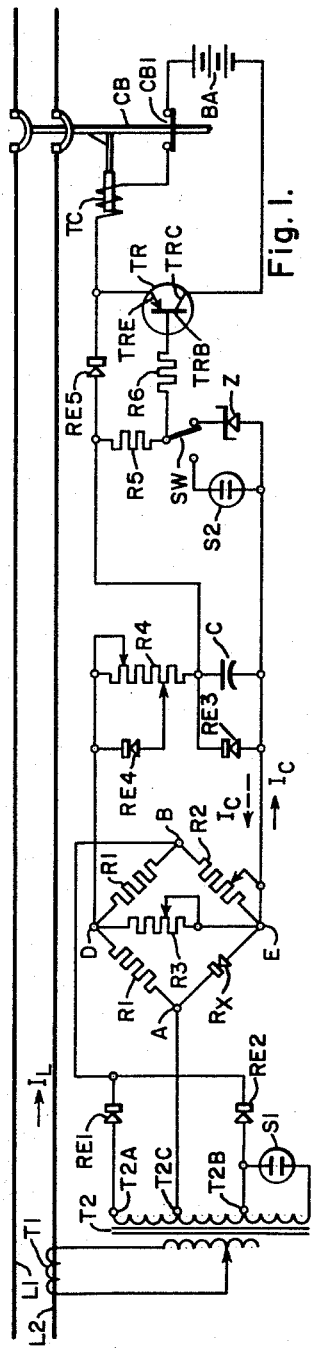
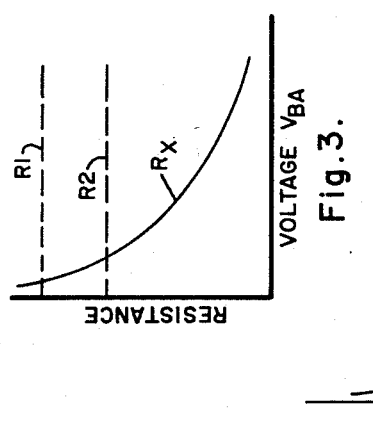
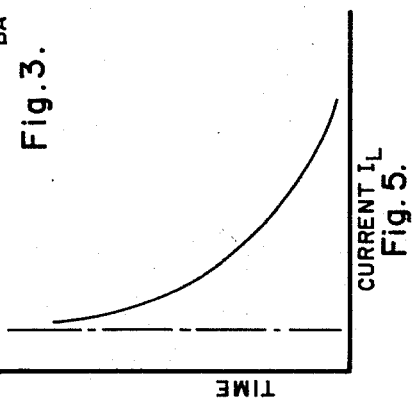
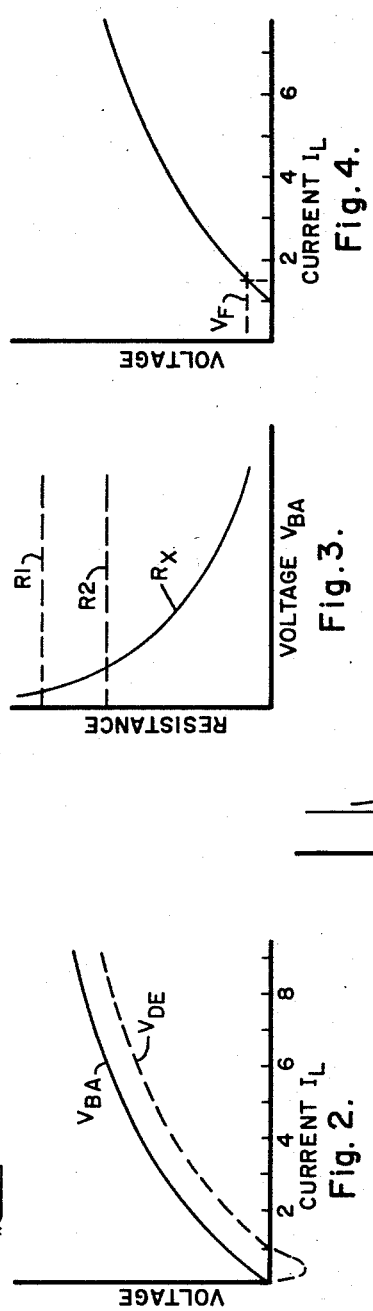
WITNESSES:
Bernard R. Gregory
James F. Young
INVENTOR
William E. Glassburn
BY C. L. Freedman
ATTORNEY

# United States Patent Office 3,133,230
Patented May 12, 1964

3,133,230
ELECTRORESPONSIVE PROTECTIVE SYSTEMS
William E. Glassburn, Mountainside, N.J., assignor to Westinghouse Electric Corporation, East Pittsburgh, Pa., a corporation of Pennsylvania
Filed Sept. 8, 1961, Ser. No. 136,818
7 Claims. (Cl. 317—36)

This invention relates to electroresponsive protective systems and it has particular relation to time-delay protective relays to be employed in such systems.

Time-delay devices are widely employed for protecting electrical systems. In their commercial embodiments such devices usually employ electro-motive components and are designed to have responses represented by well-known time curves.

Although aspects of the invention may be incorporated in various types of protective relays such as voltage relays the invention is particularly suitable for overcurrent time-delay protective relays to be utilized for protecting alternating-current electric systems. The invention will be described as applied to such an overcurrent relay.

In accordance with the invention a direct voltage is derived from a quantity present in an electrical system to be protected. For present purposes it will be assumed that this quantity is the line current of an alternating-current electric system. The derivation of this direct voltage is such that the polarity of the voltage changes as the line current passes through a predetermined magnitude or value. Time is measured by storing an electric quantity derived from only one polarity of the direct voltage. The remaining polarity of the direct voltage is utilized to render effective a low-resistance discharge circuit for the stored quantity. This facilitates a rapid reset of the time measuring unit. Translating means responsive to the stored quantity may be utilized for a control function such as the tripping of a circuit breaker associated with the alternating-current system to be protected. In accordance with a further aspect of the invention the components of the protective device are of a static or non-motive construction.

It is therefore an object of the invention to provide an improved electroresponsive protective system having a minimum number of motive parts.

It is also an object of this invention to provide an improved time-delay protective device having a fast reset.

Other objects of the invention will be apparent from the following description taken in conjunction with the accompanying drawing in which:

FIGURE 1 is a schematic view of an electric circuit having a protective time-delay relay associated therewith; and FIGS. 2 to 5 are graphical representations which assist in an understanding of the construction and operation of the relay shown in FIG. 1.

Referring to the drawing, FIG. 1 shows an electric circuit or system to be protected. The circuit of FIG. 1 is representative of many circuits which may be protected. For example, such a circuit may be a direct-current circuit, a polyphase alternating-current circuit or a single-phase alternating-current circuit. For present purposes it will be assumed that the circuit of FIG. 1 is a single-phase alternating-current circuit having two conductors L1 and L2 which carry an alternating current $I_L$ and operating at a conventional power frequency 60 cycles per second. A circuit breaker CB is provided for segregating predetermined parts of the electric circuit represented by the conductors L1 and L2. This circuit breaker has a trip coil TC and an auxiliary switch CB1 which is closed when the circuit breaker is in closed condition and which is open when the circuit breaker CB is in open condition. The circuit breaker is shown in closed condition.

A direct voltage is derived from the electric circuit which is to be protected and this direct voltage is applied to the terminals A and B. To this end a current transformer T1 has its primary winding energized in accordance with the current $I_L$ and has its secondary winding connected to the primary winding of a second transformer T2. The primary winding of the transformer T2 preferably is adjustable to provide an adjustable number of turns for purposes which will appear in the following discussion. This transformer has a saturable magnetic core.

The output of the transformer T2 is suitably rectified and the resultant direct voltage is applied across the terminals A and B. In the specific embodiment of FIG. 1, the secondary winding of the transformer T2 has two terminals T2A and T2B with a center tap or terminal T2C located between the two first-named terminals. The two terminals T2A and T2B are connected respectively through unilaterally-conductive devices or rectifiers RE1 and RE2 to the terminal B. The center tap or terminal T2C is connected to the terminal A. Because of the saturating characteristics of the transformer T2, a voltage $V_{BA}$ appears across the terminals B and A which is related to the line current $I_L$ in the manner shown by the full line curve in FIG. 2. In this figure ordinates represent voltage and abscissas represent values of the line current $I_L$. The curve can be adjusted by adjustment of the primary winding of the transformer T2.

If desired, a gaseous-discharge tube S1 may be connected across an extension of the secondary winding of the transformer T2. If excessively high voltage peaks appear in the secondary winding of the transformer T2, these peaks cause the gaseous discharge or neon tube S1 to break down for the purpose of limiting peak voltages appearing acros sthe secondary winding.

From the direct voltage appearing across the terminals A and B a direct voltage is derived across the terminals D and E which changes in polarity as the line current $I_L$ passes through a predetermined value. This change in polarity is shown by the dotted curve $V_{DE}$ in FIG. 2. By inspection of this figure it will be noted that the voltage $V_{DE}$ changes in polartiy as it passes through a point corresopnding to one unit of the current $I_L$.

The desired voltage $V_{DE}$ is obtained in the embodiment of FIG. 1 by means of a bridge having four arms. The terminals A and B serve as input terminals for the bridge whereas the terminals D and E serve as output terminals for the bridge. At least one of the arms of the bridge includes a resistor having a value of resistance which changes as a function of the voltage across the resistor or as a function of the current flowing through the resistor. In the specific embodiment of FIG. 1, one such resistor $R_X$ is employed for one of the bridge arms. The remaining arms of the bridge include resistors R1 and R2 having resistance values which are substantially independent of the current flowing through such resistors. One of the resistors R2 is adjustable for the purpose of permitting adjustment of the balance of the bridge. An adjustable load resistor R3 is connected across the terminals D and E. It will be noted that two arms of the bridge may have similar resistors R1.

Various resistors are known which have values of resistance which change as a function of a current flowing through the resistors. For example, the resistor $R_X$ may take the form of a copper-oxide rectifier. This has a resistance curve as shown by the solid curve $R_X$ in FIG. 3. In this figure values of resistance are plotted as ordinates and values of voltage $V_{BA}$ are plotted as abscissas. Resistance curves for the resistors R1 and R2 also are shown in FIG. 3. The resistance values are selected to provide a curve comparable to curve $V_{DE}$ in FIG. 2. The resistor R2 is adjusted to balance the bridge for the purpose of providing a zero voltage output across the terminals D and E when the line current $I_L$ has a value of one unit.

A time delay in the operation of the relay is introduced by connecting the voltage appearing across the terminals D and E across an adjustable resistor R4 and a capacitor C in series. A unilaterally-conductive device or rectifier RE3 is connected across the capacitor C and a similar device or rectifier RE4 is connected across an adjustable part of the resistor R4. The charge and discharge of the capacitor C now will be considered.

Let it be assumed that the line current $I_L$ is zero and that the voltage $V_{DE}$ also is zero. As the line current $I_L$ starts to increase, the voltage $V_{DE}$ as shown by the dotted curve in FIG. 2 first has negative values. Under such circumstances the terminal E is positive with respect to the terminal D and the voltage across these terminals produces a current flow in the direction shown by the full-line arrow $I_C$. This current flows from the terminal E through the rectifier RE3, the lower part of the resistor R4 and the rectifier RE4 to the terminal D. At this stage any charge remaining in the capacitor C is rapidly dissipated and a substantially zero voltage appears across the capacitor.

As the line current $I_L$ increases through the value corresponding to one unit the voltage $V_{DE}$ reverses in polarity. This means that the terminal D becomes positive relative to the terminal E and the voltage across these terminals produces a current $I_C$ in the direction of the dotted-line arrow. This current is blocked by the rectifiers RE3 and RE4. Consequently, the current is forced to flow through the effective part of the resistor R4 and the capacitor C in series. The voltage across the capacitor C starts to build up at a rate dependent on the magnitude of the voltage $V_{DE}$, the effective value of the resistance of the resistor R4 and the size of the capacitor C. The voltage across the capacitor C is shown in FIG. 4 wherein ordinates represents voltage and abscissas represent the line current $I_L$. Should the line current $I_L$ drop after the capacitor C has reached a substantially maximum charge for the line current then flowing, the charge will decrease to a new value corresponding to the decreased line current rapidly because of the low resistance path for a discharge provided by the rectifier RE4 which shunts a substantial part of the resistor R4. Should the line current thereafter drop to a value below one unit as shown in FIG. 2, the reversal in polarity of the voltage $V_{DE}$ assures a prompt discharge of the capacitor C.

Tripping of the circuit breaker CB is controlled by the voltage across the capacitor C. Preferably such tripping is initiated only if the voltage across the capacitor C exceeds a predetermined value $V_F$ which is indicated in FIG. 4. In the preferred embodiment of the invention shown in FIG. 1 the voltage across the capacitor is applied across a resistor R5 in series with a device which blocks the flow of current until the voltage thereacross exceeds a predetermined value. For values of the voltage in excess of the predetermined value the device offers a relatively low resistance to the passage of current. Devices of this type are well known in the art and are represented in FIG. 1 by a Zener diode Z and a gaseous discharge tube S2. When a switch SW is in the position illustrated in FIG. 1, the Zener diode Z is connected in series with the resistor R5 across the capacitor C.

As well known in the art a Zener diode offers a substantial resistance to the flow of current therethrough until the voltage thereacross exceeds a predetermined value. Above this value of voltage the Zener diode offers a relatively low resistance to the flow of current. This operation of the Zener diode is non-destructive and when the voltage drops below the predetermined value the Zener diode again offers a high resistance to the flow of current therethrough. The Zener diode is designed to break down when the voltage thereacross exceeds the value $V_F$ shown in FIG. 4.

As the voltage across the capacitor C starts to build up the Zener diode Z initially offers a high resistance to the flow of current therethrough. Consequently, at this stage the voltage drop across the resistor R5 is substantially zero. This condition persists until the voltage across the capacitor C exceeds the value $V_F$ at which the Zener diode breaks down. As a result of such break down, the capacitor C discharges through the resistor R5 and produces a substantial voltage drop thereacross. This voltage drop is employed for initiating a tripping operation of the circuit breaker CB.

If the switch SW is moved to the left as viewed in FIG. 1, it connects a gaseous discharge tube S2 in series with the resistor R5 across the capacitor C. This gaseous discharge tube is designed to offer a high resistance to the flow of current until the voltage across the capacitor C exceeds the value $V_F$ shown in FIG. 4. At this stage the gaseous discharge tube breaks down and the capacitor discharges through the resistor R5 to initiate a tripping operation. The discharge through the tube S2 is non-destructive. Consequently, when the capacitor C is discharged the tube S2 again is conditioned to offer a high resistance to the flow of current therethrough until the voltage thereacross again reaches a value sufficient to break down the tube. Tubes of this type are well known in the art.

Although the voltage drop across the resistor R5 may be employed directly to trip the circuit breaker CB, preferably the voltage drop R5 is employed for controlling an amplifier which in turn controls the tripping of the circuit breaker CB. In the preferred embodiment of FIG. 1, the amplifier takes the form of a transistor TR having an emitter TRE, a collector TRC and a base TRB. The resistor R5 is connected across the emitter and base of the transistor through a rectifier RE5 and a resistor R6.

When the Zener diode Z breaks down the resultant voltage drop across the resistor R5 directs a current through the rectifier RE5, the emitter TRE and the resistor R6. This current turns on the transistor and a current now is supplied by a source of direct current such as a battery BA through an auxiliary switch CB1 (which is closed when the circuit breaker is closed), the trip coil TC, the emitter TRE, and the collector TRC back to the battery BA. This results in a tripping operation of the circuit breaker CB. It will be noted that the rectifier RE5 blocks the flow of current from the battery BA through the rectifier.

The overall operation of the system of FIG. 1 now may be considered briefly. When voltage is first applied to the conductors L1 and L2 a negative voltage $V_{DE}$ is applied to the circuit of the capacitor C to assure discharge or reset of the capacitor. As the line current $I_L$ increases the voltage $V_{DE}$ reverses in polarity and starts to charge the capacitor C. When the value of voltage across the capacitor C exceeds the voltage $V_F$ required to break down the Zener diode Z, the capacitor discharges through the resistor R5. The voltage drop across the resistor R5 then turns on the transistor TR to trip the circuit breaker CB.

The relation between the line current $I_L$ and the time required for the voltage to reach a value across the capacitor C sufficient to break down Zener diode Z is shown in FIG. 5. In this figure ordinates represent time and abscissas represent values of the line current $I_L$.

Although the invention has been described with reference to certain specific embodiments thereof, numerous modifications falling within the spirit and scope of the invention are possible.

I claim as my invention:

1. In a protective arrangement for an electric circuit, a protective assembly having input terminals, said protective assembly comprising directional voltage means controlled by energization of said input terminals for producing a direct-voltage output having a first polarity for small magnitudes of energization of said input terminals and having a second polarity for larger magnitudes of energization of said input terminals, electric storage means coupled to said directional voltage means and including a storage device controlled by the direct-voltage output thereof to store an electric quantity substantially only when said direct-voltage output has the second of said polarities, and a control circuit coupled to the storage means and including translating means responsive to the quantity stored by said storage device for conditioning the control circuit to perform a control operation.

2. In a protective arrangement for an electric circuit, a protective assembly having input terminals, said protective assembly comprising directional voltage means controlled by energization of said input terminals for producing a direct-voltage output having a first polarity for small magnitudes of energization of said input terminals and having a second polarity for larger magnitudes of energization of said input terminals, electric storage means coupled to said directional voltage means and including a capacitor controlled by the direct-voltage output of the directional voltage means to store in the capacitor an electric quantity substantially only when said direct-voltage output has the second of said polarities, and a control circuit coupled to the storage means and including translating means responsive to the quantity stored by said capacitor for conditioning the control circuit to perform a control operation.

3. In a protective arrangement for an electric circuit, a protective assembly having input terminals, said protective assembly comprising directional voltage means controlled by energization of said input terminals for producing a direct-voltage output having a first polarity for small magnitudes of energization of said input terminals and having a second polarity for larger magnitudes of energization of said input terminals, electric storage means coupled to said directional voltage means and including a capacitor connected for energization by the direct-voltage output of the directional voltage means, a unilaterally-conductive device connected in parallel with said capacitor to permit substantial charging of the capacitor only by the second polarity of the direct-voltage output of the directional voltage means, and a control circuit connected to the storage means and including translating means responsive to the charge stored in the capacitor for conditioning the control circuit to perform a control operation.

4. In a protective arrangement for an electric circuit, a protective assembly having input terminals, said protective assembly comprising directional voltage means controlled by energization of said input terminals for producing a direct-voltage output having a first polarity for small magnitudes of energization of said input terminals and having a second polarity for larger magnitudes of energization of said input terminals, electric storage means coupled to said directional voltage means and including a storage device controlled by the direct-voltage output thereof to store an electric quantity substantially only when said direct-voltage output has the second of said polarities, and a control circuit connected to the storage means and including translating means responsive to the quantity stored by said storage device for conditioning the control circuit to perform a control operation, said directional voltage means comprising a source of direct voltage, a bridge circuit connected to the source of direct voltage and having an input derived from said direct voltage and having said direct-voltage output, said bridge circuit including in one arm a device offering a resistance which decreases in response to an increase in voltage thereacross, and means for adjusting the balance point of the bridge circuit to provide a zero direct-voltage output at a value of input direct voltage which is intermediate the terminal values of the direct-voltage input range for which the bridge circuit is rated, whereby the polarity of the direct-voltage output changes as such voltage passes through said zero value.

5. In a protective arrangement for an electric circuit, a protective assembly having input terminals, said protective assembly comprising directional voltage means controlled by energization of said input terminals for producing a direct-voltage output having a first polarity for small magnitudes of energization of said input terminals and having a second polarity for larger magnitudes of energization of said input terminals, electric storage means coupled to said directional voltage means and including a capacitor connected for energization by the direct-voltage output of the directional voltage means, a unilaterally-conductive device connected in parallel with said capacitor to permit substantial charging of the capacitor only by the second polarity of said direct-voltage output of the directional voltage means, a resistor connected in series with the capacitor to control the rate of charge of the capacitor, a unilaterally-conductive device connected in parallel with at least a portion of the resistor to expedite discharge of the capacitor, and a control circuit coupled to the capacitor and including translating means responsive to the charge stored in the capacitor for conditioning the control circuit to perform a control operation.

6. In a protective arrangement for an electric circuit, a protective assembly having input terminals, a transformer designed to saturate within the rated range of energization of the transformer, rectifying means connected for energization from the secondary of the transformer for supplying a direct voltage to said input terminals, said protective assembly comprising directional voltage means connected to the input terminals and controlled by energization of said input terminals for producing a direct-voltage output having a first polarity for small magnitudes of energization of said input terminals and having a second polarity for larger magnitudes of energization of said input terminals, electric storage means coupled to the directional voltage means and including a capacitor controlled by said direct-voltage output of the directional voltage means to store in the capacitor an electric quantity substantially only when said direct-voltage output has the second of said polarities, and a control circuit coupled to the storage means and including translating means responsive to the quantity stored by said capacitor for conditioning the control circuit to perform a control operation.

7. In a protective arrangement for an alternating electric circuit, a magnetic-core transformer designed to saturate within its rated range of energization, rectifying means energized from the secondary of the transformer to produce a direct voltage, a protective assembly having input terminals connected to the rectifying means for energization by the direct voltage, a bridge circuit connected to the input terminals and having four resistor arms and having an input derived from said direct voltage to provide a direct-voltage output, one of said arms having a resistance which decreases in response to an increase in voltage thereacross, means for adjusting the balance point of the bridge circuit to provide a zero direct-voltage output at a value of input direct voltage which is intermediate the terminal values of the direct-voltage input range for which the bridge circuit is rated, whereby the polarity of the direct-voltage output changes as such voltage passes through said zero value, a control resistor and a capacitor connected in a series circuit to said bridge circuit for energization by said direct-voltage output of the bridge circuit, a unilaterally-conductive device connected in parallel with said capacitor to permit substantial charging of the capacitor only by current flowing in a first direction in the series circuit, a unilaterally-conductive device connected in parallel with at least part of the control resistor to provide a low-resistance path through such device for a charge stored in the capacitor by current flowing in said first direction, an output circuit including a non-linear device connected across said capacitor, said non-linear device permitting a substantial non-destructive current flow therethrough only for a voltage across the non-linear device in excess of a predetermined value, and a control circuit including translating means responsive to substantial current flow in said output circuit for conditioning the control circuit to perform a control operation.

References Cited in the file of this patent

UNITED STATES PATENTS 2,981,867     Hopkins et al. _____ Apr. 25, 1961